(12) United States Patent
Lee

(10) Patent No.: US 9,185,283 B2
(45) Date of Patent: Nov. 10, 2015

(54) APPARATUS AND METHOD FOR AUTOMATICALLY ADJUSTING FOCUS IN IMAGE CAPTURING DEVICE

(75) Inventor: Yong-Gu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/553,127

(22) Filed: Jul. 19, 2012

(65) Prior Publication Data

US 2013/0021520 A1    Jan. 24, 2013

(30) Foreign Application Priority Data

Jul. 20, 2011    (KR) .......................... 10-2011-0072179

(51) Int. Cl.
*H04N 5/232* (2006.01)
*G03B 13/00* (2006.01)
*H04N 5/235* (2006.01)

(52) U.S. Cl.
CPC ......... *H04N 5/23212* (2013.01); *H04N 5/2351* (2013.01); *H04N 5/2354* (2013.01)

(58) Field of Classification Search
CPC  H04N 5/23212; H04N 5/2354; H04N 5/2351
USPC ........................................ 348/349, 345, 234
See application file for complete search history.

(56) References Cited

U.S. PATENT DOCUMENTS

| 4,196,997 | A  | * | 4/1980 | Ohmori et al. ................ 396/298 |
| 5,526,088 | A  | * | 6/1996 | Kusaka ........................... 396/96 |
| 6,727,942 | B1 | * | 4/2004 | Miyano ..................... 348/223.1 |
| 2005/0030415 | A1 | * | 2/2005 | Takizawa ...................... 348/362 |
| 2007/0065134 | A1 | * | 3/2007 | Sugimoto .................... 396/165 |
| 2010/0149380 | A1 |   | 6/2010 | Chou et al. |
| 2011/0242352 | A1 | * | 10/2011 | Hikosaka ................... 348/222.1 |
| 2012/0105668 | A1 | * | 5/2012 | Velarde et al. ............. 348/223.1 |
| 2012/0177353 | A1 | * | 7/2012 | Dowell ......................... 396/106 |

FOREIGN PATENT DOCUMENTS

| JP | 2010/107862 | A | | 5/2010 |
| JP | 2010107862 | A | * | 5/2010 |
| WO | 2012/058239 | A1 | | 5/2012 |

* cited by examiner

*Primary Examiner* — Antoinette Spinks
(74) *Attorney, Agent, or Firm* — Jefferson IP Law, LLP

(57) ABSTRACT

An apparatus and a method for automatically adjusting a focus in an image capturing device are provided. The method includes generating an image by capturing a subject through a lens when a flash unit is enabled, dividing the image into a plurality of windows, determining a brightest window from among the plurality of windows, and setting an Auto Focus (AF) detection area for performing an AF function centering on the determined window.

16 Claims, 6 Drawing Sheets

| $W_{11}$ | $W_{12}$ | $W_{13}$ | $W_{14}$ | $W_{15}$ | ... | ... | $W_{1N}$ |
|---|---|---|---|---|---|---|---|
| $W_{21}$ | $W_{22}$ | $W_{21}$ | $W_{24}$ | $W_{25}$ | ... | ... | $W_{2N}$ |
| $W_{33}$ | $W_{32}$ | $W_{33}$ | $W_{34}$ | $W_{35}$ | ... | ... | $W_{3N}$ |
| $W_{41}$ | $W_{42}$ | $W_{43}$ | $W_{44}$ | $W_{45}$ | ... | ... | $W_{4N}$ |
| ... | ... | ... | ... | ... | ... | ... | ... |
| ... | ... | ... | ... | ... | ... | ... | ... |
| $W_{M1}$ | $W_{M2}$ | $W_{M3}$ | $W_{M4}$ | $W_{M5}$ | ... | ... | $W_{MN}$ |

301

| $Y_{11}$ | $Y_{12}$ | $Y_{13}$ | $Y_{14}$ | $Y_{15}$ | ... | ... | $Y_{1N}$ |
|---|---|---|---|---|---|---|---|
| $Y_{21}$ | $Y_{22}$ | $Y_{21}$ | $Y_{24}$ | $Y_{25}$ | ... | ... | $Y_{2N}$ |
| $Y_{33}$ | $Y_{32}$ | $Y_{33}$ | $Y_{34}$ | $Y_{35}$ | ... | ... | $Y_{3N}$ |
| $Y_{41}$ | $Y_{42}$ | $Y_{43}$ | $Y_{44}$ | $Y_{45}$ | ... | ... | $Y_{4N}$ |
| ... | ... | ... | ... | ... | ... | ... | ... |
| ... | ... | ... | ... | ... | ... | ... | ... |
| $Y_{M1}$ | $Y_{M2}$ | $Y_{M3}$ | $Y_{M4}$ | $Y_{M5}$ | ... | ... | $Y_{MN}$ |

APPARATUS AND METHOD FOR AUTOMATICALLY ADJUSTING FOCUS IN IMAGE CAPTURING DEVICE

PRIORITY

This application claims the benefit under 35 U.S.C. §119(a) of a Korean patent application filed in the Korean Intellectual Property Office on Jul. 20, 2011 and assigned Serial No. 10-2011-0072179, the contents of which are incorporated herein by reference.

BACKGROUND OF THE INVENTION

1. Field of the Invention

The present invention relates generally to an image capturing device. More particularly, the present invention relates to an apparatus and method for automatically adjusting a focus in an image capturing device.

2. Description of the Related Art

Recently, the rapid development of image devices has accelerated the development of image capturing devices, such as cameras and camcorders equipped with an image sensor. These image capturing devices perform an Auto Focus (AF) function by which a subject is automatically in focus. However, since the AF function is performed centering on the central area of an image, an image capturing device cannot perform the AF function on a subject when the subject is not located in the central area of an image.

SUMMARY OF THE INVENTION

Aspects of the present invention are to address the above-mentioned problems and/or disadvantages and to provide at least the advantages described below. Accordingly, an aspect of the present invention is to provide an apparatus and method for performing an AF function on a subject even though a subject is not located in the central area of an image.

Another aspect of the present invention is to provide an apparatus and method for perceiving a position of a subject when a flash unit is enabled in a dark environment with a low level of illumination and performing an AF function centering on the perceived position.

In accordance with an aspect of the present invention, an apparatus for automatically adjusting a focus in an image capturing device is provided. The apparatus includes an image sensor for generating an image by capturing a subject through a lens, a flash unit for generating a flash of light while the image sensor is capturing the image, and a controller for dividing the image into a plurality of windows, for determining a brightest window from among the plurality of windows, and for setting an Auto Focus (AF) detection area for performing an AF function centering on the determined window.

In accordance with another aspect of the present invention, a method of automatically adjusting a focus in an image capturing device is provided. The method includes generating an image by capturing a subject through a lens when a flash unit is enabled, dividing the image into a plurality of windows, determining a brightest window from among the plurality of windows, and setting an Auto Focus (AF) detection area for performing an AF function centering on the determined window.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description when taken in conjunction with the accompanying drawings, in which:

FIG. 3 illustrates an image to which a weight and a brightness value per window are allocated, according to an exemplary embodiment of the present invention;

Throughout the drawings, it should be noted that like reference numbers are used to depict the same or similar elements, features, and structures.

DETAILED DESCRIPTION OF THE PREFERRED EMBODIMENT

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention are described below with reference to the accompanying drawings. In the following description and the accompanying drawings, well-known functions or constructions are not described in detail since they would obscure the invention with unnecessary detail.

According to exemplary embodiments of the present invention, an image capturing device may be a camera, a camcorder, a web camera, a monitoring camera, a medical camera, a high-speed camera, or a 3-dimensional camera or may be included in wireless terminals. The wireless terminals may be portable electronic devices, such as videophones, cellular phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, laptop computers, and tablet PCs.

Figure 1:
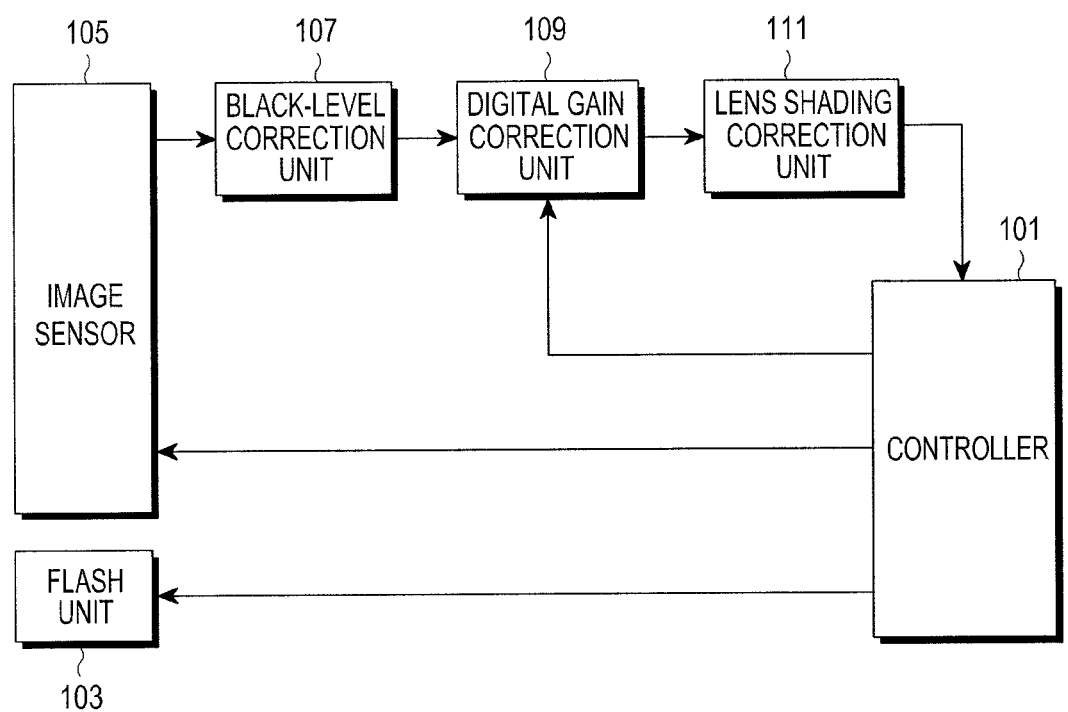
FIG. 1 is a block diagram of an image capturing device according to an exemplary embodiment of the present invention.

FIG. 1 is a block diagram of an image capturing device according to an exemplary embodiment of the present invention.

Referring to FIG. 1, the image capturing device may include a controller 101, a flash unit 103, an image sensor 105, a black-level correction unit 107, a digital gain correction unit 109, and a lens shading correction unit 111. The image capturing device may include additional units not described here for the sake of convenience. Such additional components may vary depending on the nature of the image capturing device; for example, a cellular phone may include a communication unit for transmitting and receiving data. Similarly, the units of the image capturing device may be integrated into a single component.

The flash unit 103 is a portable lighting device for generating a flash of light in capturing to brightly capture an image in a dark environment and generates a flash of light under control of the controller 101. Examples of the flash unit 103 include a Light Emitting Diode (LED) flash unit for generating a flash of light using an LED and a xenon flash unit for generating a flash of light using a xenon lamp. The dark environment is an environment with a low level of illumination, for example, night-time.

The image sensor 105 captures an image on a subject through a lens and outputs the image to the black-level correction unit 107 on a frame basis. Examples of the image sensor 105 include a Complementary Metal Oxide Semiconductor (CMOS) sensor, a Charge Coupled Device (CCD) sensor, a Foveon sensor, and a complementary image sensor. The black-level correction unit 107 receives the image from the image sensor 105, corrects a black level of the image, and outputs the black-level-corrected image to the digital gain correction unit 109.

The digital gain correction unit 109 receives the black-level-corrected image from the black level correction unit 107, corrects a digital gain of the black-level-corrected image to automatically adjust brightness under control of the controller 101, and outputs the gain-corrected image to the lens shading correction unit 111. The lens shading correction unit 111 receives the gain-corrected image from the digital gain correction unit 109, corrects lens-shading on the gain-corrected image, and outputs the lens-shading-corrected image to the controller 101. The lens shading correction unit 111 may perform the lens shading correction along a predetermined shading correction curve when brightness in an edge area of an image is lower (darker) than that in the central area according to characteristics of the image sensor 105. The lens shading indicates a phenomenon in which sensitivity of an image is non-uniform due to insufficiency of light intensity around a lens system in the image capturing device.

As described above, the digital gain correction unit 109 for correcting a digital gain of an image and the lens shading correction unit 111 for correcting lens shading on an image are components for performing pre-processing of an image output from the image sensor 105.

The controller 101 controls the general operation of the image capturing device. For example, the controller 101 controls an exposure time and an analog gain of the image sensor 105, controls a digital gain of the digital gain correction unit 109, and controls ON/OFF of the flash unit 103.

Figure 2:
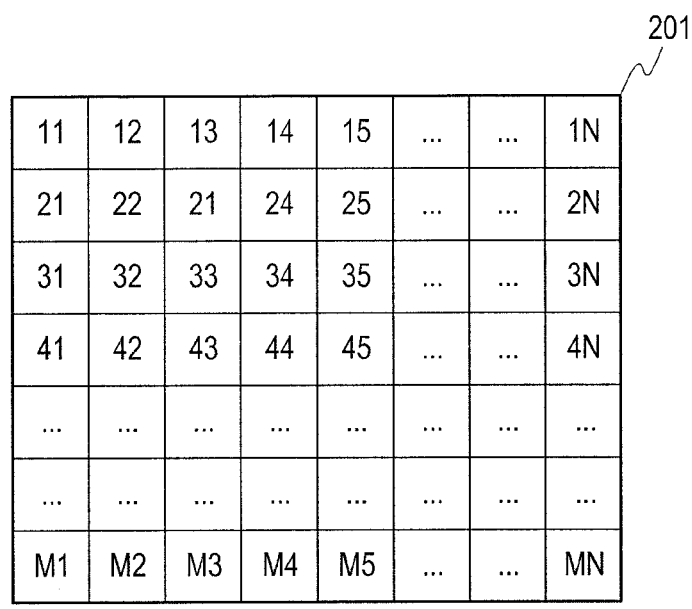
FIG. 2 illustrates an image divided into a plurality of windows, according to an exemplary embodiment of the present invention.

FIG. 2 illustrates an image divided into a plurality of windows, according to an exemplary embodiment of the present invention.

Referring to FIG. 2, when the flash unit 103 is turned on (or enabled), the controller 101 receives an image from the lens shading correction unit 111 after the flash unit 103 is turned on and divides the image into a plurality of windows. For example, the controller 101 may divide an image 201 into M×N windows, wherein M and N are integers.

FIG. 3 illustrates an image to which a weight and a brightness value per window are allocated, according to an exemplary embodiment of the present invention.

The controller 101 calculates brightness values corresponding to the plurality of windows. The brightness values may be calculated using any one of illumination, luminosity, and luminous intensity. For example, the controller 101 may calculate brightness values $Y_{ij}$ of the M×N windows of an image 303.

The controller 101 searches for a weight pre-set by a user from among window-based weights allocated to brightness values, which are stored in a memory unit (not shown). The window-based weights are weights previously stored in the memory unit, including a first weight for adding a brightness weight to windows located in the central area of an image, a second weight for adding a brightness weight to windows located in left and right areas of the image except for the central area, and a third weight for adding a brightness weight to windows located in a plurality of areas of the image. For example, the controller 101 may search for window-based weights $W_{ij}$ of the M×N windows of the image 301.

The controller 101 generates window-based weighted brightness values based on the calculated window-based brightness values and the pre-set window-based weights. The controller 101 calculates window-based weighted brightness values by multiplying the calculated window-based brightness values by the pre-set window-based weights on a window-to-window basis. For example, the controller 101 may calculate M×N window-based weighted brightness values by multiplying the M×N window-based brightness values $Y_{ij}$ by the M×N window-based weights $W_{ij}$, respectively.

The controller 101 selects a maximum weighted brightness value from among the weighted brightness values corresponding to the plurality of windows and compares the selected maximum weighted brightness value with a predetermined reference brightness value $Y_{TH}$. If the selected maximum weighted brightness value is greater than the predetermined reference brightness value $Y_{TH}$, the controller 101 compares the selected maximum weighted brightness value with a predetermined saturated brightness value.

If the selected maximum weighted brightness value is less than the predetermined saturated brightness value, the controller 101 sets an Auto Focus (AF) detection area centering on a window corresponding to the selected maximum weighted brightness value. If the selected maximum weighted brightness value is equal to or greater than the predetermined saturated brightness value, the controller 101 excludes the selected maximum weighted brightness value from the weighted brightness values corresponding to the plurality of windows, reselects a maximum weighted brightness value from among the weighted brightness values except for the selected maximum weighted brightness value, and compares the reselected maximum weighted brightness value with the predetermined reference brightness value $Y_{TH}$.

The predetermined saturated brightness value is a reference value to determine whether brightness of any window is saturated, and may be defined by Equation 1.

$$Y_{saturation} = 95\% \times \text{maximum brightness level} \quad (1)$$

$Y_{saturation}$ denotes the predetermined saturated brightness value, and the maximum brightness level indicates the highest weighted brightness value which can be calculated as a maximum weighted brightness value of any window. If necessary, when the maximum brightness level is changed, the predetermined saturated brightness value may also be changed.

If the selected maximum weighted brightness value is equal to or less than the predetermined reference brightness value $Y_{TH}$, the controller 101 sets an AF detection area centering on a window located at the center of the image. The AF detection area indicates an area for performing an AF function in the image capturing device, and the AF function indicates a function by which a subject is automatically in focus.

Figure 4:
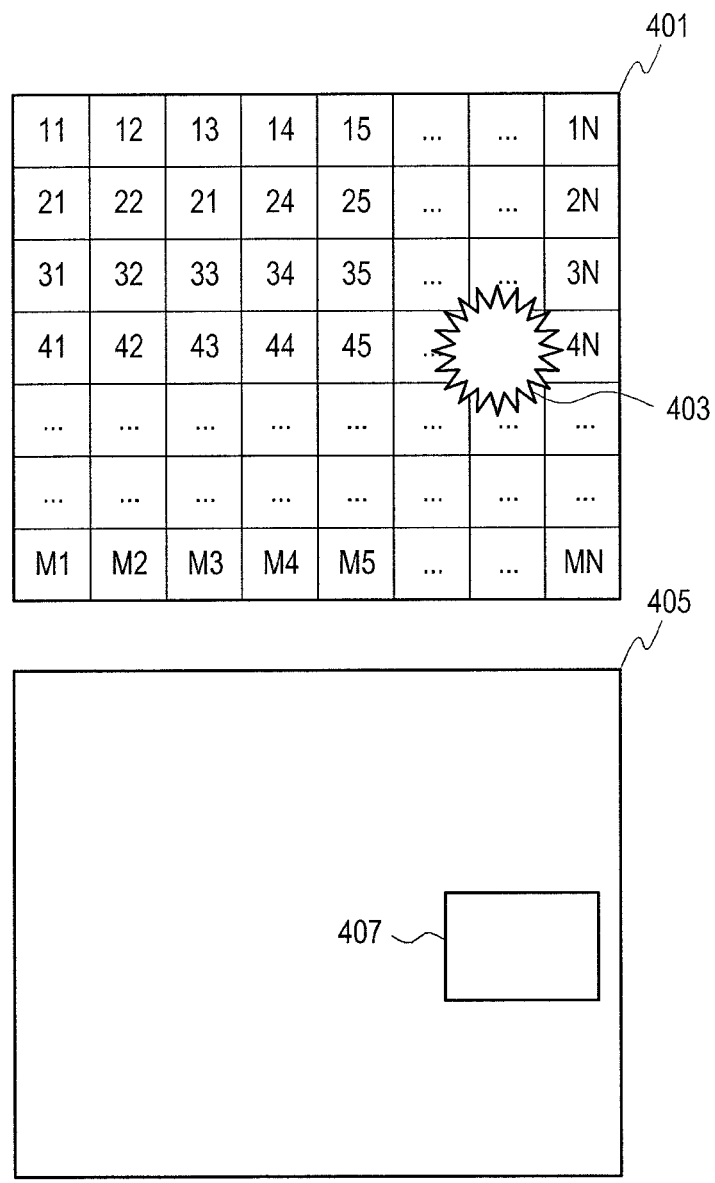
FIG. 4 illustrates an AF detection area set by the image capturing device according to an exemplary embodiment of the present invention.

FIG. 4 illustrates an AF detection area set by the image capturing device according to an exemplary embodiment of the present invention.

Referring to FIG. 4, if a window 403 from among M×N windows 401 corresponds to a maximum weighted brightness value, the controller 101 may set an AF detection area 407 centering on the window 403 in an image 405. The controller 101 captures an image by considering the set AF detection area 407 and stores the captured image in the memory unit.

Figure 5:
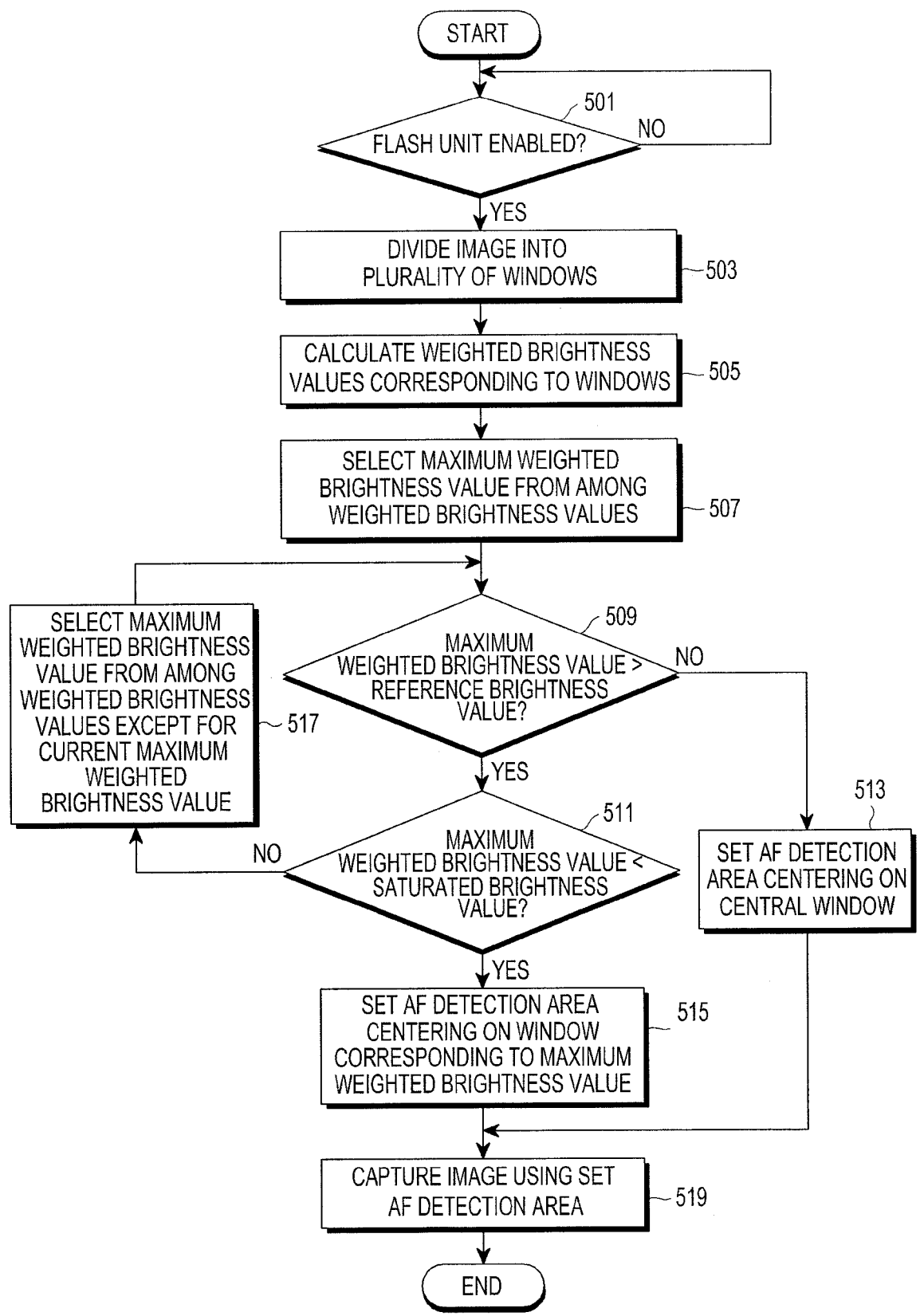
FIG. 5 is a flowchart illustrating a process of setting an Auto Focus (AF) detection area in the image capturing device, according to an exemplary embodiment of the present invention.

FIG. 5 is a flowchart illustrating a process of setting an AF detection area in the image capturing device, according to an exemplary embodiment of the present invention.

Referring to FIG. 5, in step 501, the controller 101 determines whether the flash unit 103 is enabled. If the flash unit 103 is enabled, the controller 101 proceeds to step 503; if the flash unit 103 is not enabled, the controller 101 repeatedly performs step 501. The controller 101 enables the flash unit 103 by a request of a user or according to a predetermined condition. The predetermined condition may be a condition in which the flash unit 103 automatically is enabled if a brightness value of an environment outside the image capturing device is equal to or less than a predetermined reference value or a condition in which the flash unit 103 is enabled at a predetermined time.

In step 503, the controller 101 receives an image generated after enabling of the flash unit 103 from the lens shading correction unit 111, divides the received image into a plurality of windows, and proceeds to step 505.

In step 505, the controller 101 calculates weighted brightness values corresponding to the plurality of windows. The controller 101 calculates brightness values corresponding to the plurality of windows and searches for weights pre-set by the user from among window-based weights for brightness values, which are previously stored in the memory unit. The brightness values may be calculated using any one of illumination, luminosity, and luminous intensity. The controller 101 calculates window-based weighted brightness values by multiplying the calculated window-based brightness values by the pre-set window-based weights on a window-to-window basis.

In step 507, the controller 101 selects a maximum weighted brightness value from among the weighted brightness values corresponding to the plurality of windows.

In step 509, the controller 101 compares the selected maximum weighted brightness value with a predetermined reference brightness value. If the selected maximum weighted brightness value is greater than the predetermined reference brightness value, the controller 101 proceeds to step 511. If the selected maximum weighted brightness value is equal to or less than the predetermined reference brightness value, the controller 101 proceeds to step 513.

In step 511, the controller 101 compares the selected maximum weighted brightness value with a predetermined saturated brightness value. If the selected maximum weighted brightness value is less than the predetermined saturated brightness value, the controller 101 proceeds to step 515. If the selected maximum weighted brightness value is equal to or greater than the predetermined saturated brightness value, the controller 101 proceeds to step 517. The predetermined saturated brightness value is a reference value to determine whether brightness of any window is saturated and may be defined by Equation 1.

In step 517, the controller 101 excludes the current (selected) maximum weighted brightness value from the weighted brightness values corresponding to the plurality of windows, reselects a maximum weighted brightness value from among the weighted brightness values except for the current maximum weighted brightness value, and returns to step 509.

In step 515, the controller 101 sets an AF detection area centering on a window corresponding to the maximum weighted brightness value. The AF detection area indicates an area for performing an AF function in the image capturing device, and the AF function indicates a function by which a subject is automatically in focus.

In step 513, the controller 101 sets an AF detection area centering on a window located at the center of the image. In step 519, the controller 101 captures an image by considering the set AF detection area and stores the captured image. By performing the foregoing steps, the image capturing device may capture an image by automatically focusing on a subject located in a bright area of the image.

Figure 6:
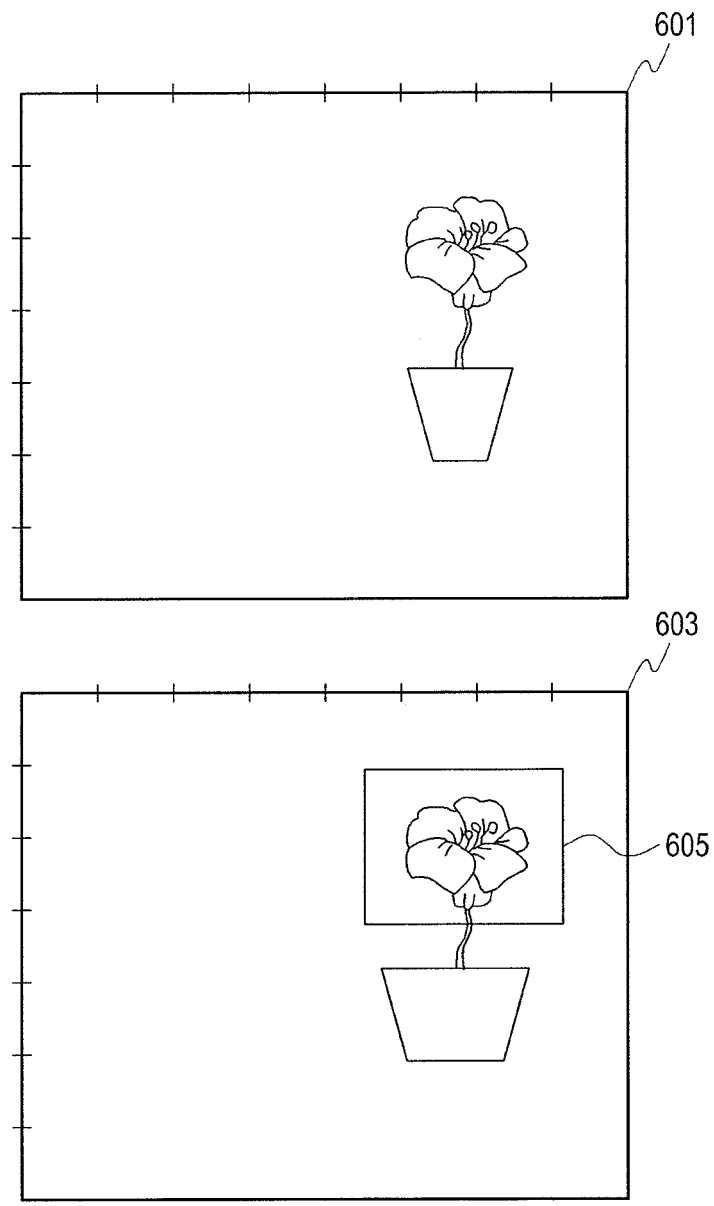
FIG. 6 illustrates an AF detection area set centering on a subject by the image capturing device according to an exemplary embodiment of the present invention.

FIG. 6 illustrates an AF detection area set centering on a subject by the image capturing device according to an exemplary embodiment of the present invention.

An image 601 indicates an image before an AF detection area is set, and an image 603 indicates an image after an AF detection area 605 is set. If a subject in the image 601 is located in the brightest area in the image 601, the controller 101 may set the AF detection area 605 centering on the subject located in the image 603.

According to exemplary embodiments of the present invention, if the flash unit 103 is enabled in a dark environment, the image capturing device perceives a position of a subject using brightness values of windows in an image and sets an AF detection area centering on the perceived position. The image capturing device perceives that the subject is located at the brightest window from among the windows.

As is apparent from the foregoing description, even though a subject is not located in the central area of an image, an AF function on the subject can be performed.

In addition, when a flash unit is enabled in a dark environment with a low level of illumination, a position of a subject can be perceived, and an AF function can be performed centering on the perceived position.

While the invention has been shown and described with reference to certain exemplary embodiments, such as a mobile communication terminal, thereof, it will be understood by those skilled in the art that various changes in form and details may be made therein without departing from the spirit and scope of the invention as defined by the appended claims and their equivalents.

What is claimed is:

1. An apparatus for automatically adjusting a focus in an image capturing device, the apparatus comprising:
   an image sensor configured to generate an image by capturing a subject through a lens;
   a flash unit configured to generate a flash of light while the image sensor is capturing the image; and
   a controller configured to:
      divide an entire portion of the image captured using the flash of light into a plurality of windows;
      calculate a brightness value for each respective window of the plurality of windows;
      determine which window, from among the plurality of windows, is the brightest based on the calculated brightness values;
      set an Auto Focus (AF) detection area for performing an AF function centering on the window determined to be the brightest, if the brightness value corresponding to the window determined to be the brightest is greater than a reference brightness value; and
      set the AF detection area centering on a window located at a center of the plurality of windows, if the brightness value corresponding to the window determined to be the brightest is equal to or less than the reference brightness value.

2. The apparatus of claim 1, wherein the controller is configured to capture an image based on the AF detection area.

3. The apparatus of claim 1, wherein the controller is configured to determine the brightest window from among the plurality of windows based on the calculated brightness values and window-based weights indicating brightness weights allocated to the plurality of windows.

4. The apparatus of claim 3, wherein the controller is configured to determine weighted brightness values corresponding to the plurality of windows by multiplying the calculated brightness values by the window-based weights on a window-to-window basis, to select a first maximum weighted brightness value from among the weighted brightness values, to compare the first maximum weighted brightness value with a predetermined reference brightness value, and if the first maximum weighted brightness value is greater than the predetermined reference brightness value as a result of the comparison, to determine a window corresponding to the first maximum weighted brightness value as the brightest window.

5. The apparatus of claim 4, wherein, if the first maximum weighted brightness value is equal to or less than the predetermined reference brightness value, the controller is configured to set the AF detection area centering on a window located at the center of the plurality of windows.

6. The apparatus of claim 4, wherein, if the first maximum weighted brightness value is greater than the predetermined reference brightness value, the controller is configured to compare the first maximum weighted brightness value with a predetermined saturated brightness value, and if the first maximum weighted brightness value is less than the predetermined saturated brightness value, to determine a window corresponding to the first maximum weighted brightness value as the brightest window.

7. The apparatus of claim 6, wherein, if the first maximum weighted brightness value is equal to or greater than the predetermined saturated brightness value, the controller is configured to exclude the first maximum weighted brightness value from the weighted brightness values, to select a second maximum weighted brightness value from among the weighted brightness values except for the first maximum weighted brightness value, and to compare the second maximum weighted brightness value with the predetermined reference brightness value.

8. The apparatus of claim 3, wherein the controller is configured to determine weighted brightness values corresponding to the plurality of windows by multiplying the calculated brightness values by the window-based weights on a window-to-window basis, to select a first maximum weighted brightness value from among the weighted brightness values, to compare the first maximum weighted brightness value with a predetermined reference brightness value, and if the first maximum weighted brightness value is greater than the predetermined reference brightness value, the controller is configured to select one of the weighted brightness values which has the highest brightness value that is less than or equal to a predetermined saturated brightness value, and to determine a window corresponding to the selected weighted brightness value as the brightest window.

9. A method of automatically adjusting a focus in an image capturing device, the method comprising:
   generating an image by capturing a subject through a lens when a flash unit is enabled;
   dividing an entire portion of the image captured using the flash of light into a plurality of windows;
   calculating a brightness value for each respective window of the plurality of windows;
   determining which window, from among the plurality of windows, is the brightest based on the calculated brightness values;
   setting an Auto Focus (AF) detection area for performing an AF function centering on the window determined to be the brightest, if the brightness value corresponding to the window determined to be the brightest is greater than a reference brightness value; and
   setting the AF detection area centering on a window located at a center of the plurality of windows, if the brightness value corresponding to the window determined to be the brightest is equal to or less than the reference brightness value.

10. The method of claim 9, further comprising capturing an image based on the AF detection area.

11. The method of claim 9, wherein the determining of the brightest window comprises:
   determining the brightest window from among the plurality of windows based on the calculated brightness values and window-based weights indicating brightness weights allocated to the plurality of windows.

12. The method of claim 11, wherein the determining of the brightest window comprises:
   determining weighted brightness values corresponding to the plurality of windows by multiplying the calculated brightness values by the window-based weights on a window-to-window basis;
   selecting a first maximum weighted brightness value from among the weighted brightness values;
   comparing the first maximum weighted brightness value with a predetermined reference brightness value; and
   if the first maximum weighted brightness value is greater than the predetermined reference brightness value, determining a window corresponding to the first maximum weighted brightness value as the brightest window.

13. The method of claim 12, wherein the determining of the brightest window comprises:
   if the first maximum weighted brightness value is greater than the predetermined reference brightness value, comparing the first maximum weighted brightness value with a predetermined saturated brightness value; and if the first maximum weighted brightness value is less than the predetermined saturated brightness value, determining a window corresponding to the first maximum weighted brightness value as the brightest window.

14. The method of claim 13, further comprising:
if the first maximum weighted brightness value is equal to or greater than the predetermined saturated brightness value, excluding the first maximum weighted brightness value from the weighted brightness values;
selecting a second maximum weighted brightness value from among the weighted brightness values except for the first maximum weighted brightness value; and
comparing the second maximum weighted brightness value with the predetermined reference brightness value.

15. The method of claim 11, wherein the determining of the brightest window comprises:
determining weighted brightness values corresponding to the plurality of windows by multiplying the calculated brightness values by the window-based weights on a window-to-window basis;
selecting a first maximum weighted brightness value from among the weighted brightness values;
comparing the first maximum weighted brightness value with a predetermined reference brightness value; and
if the first maximum weighted brightness value is greater than the predetermined reference brightness value, selecting one of the weighted brightness values which has the highest brightness value that is less than or equal to a predetermined saturated brightness value, and determining a window corresponding to the selected weighted brightness value as the brightest window.

16. The apparatus of claim 3, wherein the window-based weights are allocated to the plurality of windows by assigning a respective window-based weight is to each respective window of the plurality of windows based on a location of each respective window within the image captured using the flash of light.

* * * * *